(12) United States Patent
Waszak

(10) Patent No.: US 11,331,576 B2
(45) Date of Patent: May 17, 2022

(54) ANIMATION AND PHYSICS SYNCHRONIZATION

(71) Applicant: Electronic Arts Inc., Redwood City, CA (US)

(72) Inventor: Bartlomiej Waszak, Los Angeles, CA (US)

(73) Assignee: ELECTRONIC ARTS INC., Redwood City, CA (US)

( * ) Notice: Subject to any disclaimer, the term of this patent is extended or adjusted under 35 U.S.C. 154(b) by 18 days.

(21) Appl. No.: 16/871,766

(22) Filed: May 11, 2020

(65) Prior Publication Data

US 2021/0316221 A1   Oct. 14, 2021

Related U.S. Application Data

(60) Provisional application No. 63/009,137, filed on Apr. 13, 2020.

(51) Int. Cl.
*A63F 13/57* (2014.01)
*G06T 13/20* (2011.01)

(52) U.S. Cl.
CPC .............. *A63F 13/57* (2014.09); *G06T 13/20* (2013.01); *A63F 2300/64* (2013.01); *A63F 2300/6607* (2013.01)

(58) Field of Classification Search
CPC .................. A63F 13/57; A63F 2300/64; A63F 2300/6607; G06T 13/20
See application file for complete search history.

(56) References Cited

U.S. PATENT DOCUMENTS

| 2010/0017461 A1* | 1/2010 | Kokkevis | G06F 9/44526 709/203 |
| 2012/0058820 A1* | 3/2012 | Grills | A63F 13/52 463/30 |
| 2016/0046023 A1* | 2/2016 | Nagendran | B25J 9/1689 700/248 |

OTHER PUBLICATIONS

Mach, Michal, Physics Animation in Uncharted 4: A Thief's End, (starting at 51:36), Dec. 26, 2018, Retrieved from https://www.youtube.com/watch?v=7S-_vuoKgR4.
Waszak, Bartlomiej, Gameplay Programming in a Rich and Immersive Open World, (starting at 29:56), Jun. 3, 2016, Retrieved from: https://www.youtube.com/watch?v=kk4dXY5dWsU.
Waszak, Bartlomiej, Gameplay Programming in a Rich and Immersive Open World, Digital Dragons, May 16-17, 2016, Retrieved from: https://bartlomiejwaszak.files.wordpress.com/2016/06dd2016_assassinscreedsyndicate_gameplayprogramming_nolinearnotes_pdf.pdf.

(Continued)

*Primary Examiner* — James S. McClellan
(74) *Attorney, Agent, or Firm* — Middleton Reutlinger

(57) ABSTRACT

This specification relates to animation and physics updates in computer games. According to a first aspect of this disclosure, there is described a computer implemented method comprising: updating, using an animation engine, an in-game animation at a first rate; and updating, using an in-game physics engine, an in-game physics state at a second rate, the second rate being different to the first rate. Updating the in-game physics state comprises: interpolating one or more in-game physical parameters corresponding to a physics update time that lies between two consecutive animation update times, the interpolation based on in-game animation frames corresponding to the two consecutive animation update times; and determining the update to the in-game physics state based on the interpolated physical parameters.

20 Claims, 5 Drawing Sheets

(56) References Cited

OTHER PUBLICATIONS

Star Wars Jedi: Fallen Order Trailer—Star Wars Celebration, Apr. 13, 2019, Retrieved from: https://www.youtube.com/watch?v=vtO5P_BA5D0.
Star Wars Jedi: Fallen Order—Official Gameplay Reveal Live Stream—EA Play 2019, Jun. 8, 2019, Retrieved from https://www.youtube.com/watch?v=TtyoXez8ncU.
Star Wars Jedi: Fallen Order Video Game, Nov. 15, 2019, Retrieved from: https://www.imdb.com/title/tt5691474/.
Waszak, Bartlomiej, Gameplay Programming Patterns, (starting at 30:41 and 31.25), ECGC 2017, Jul. 12, 2017, Retrieved from: https://youtu.be/krqqxtfPXAo.

\* cited by examiner

ANIMATION AND PHYSICS SYNCHRONIZATION

BACKGROUND

Modern computer games generally run using a game engine that comprises a physics engine for simulating in-game physical systems and an animation engine (which may also be referred to as a graphics engine or rendering engine) for generating animated 3D graphics for display to a game user. A physics engine takes as input values of some physical parameters, such as positions and velocities of objects in the game world, and updates a physics state of in-game physical systems, for example by determining momentum, energy and/or updated positions and velocities of in-game objects. The animation engine generates/renders frames of animation data for display to the game player based on, for example, previous animation data, user inputs and pre-defined animations.

Typically, the animation engine is updated as part of a game-loop at the frame rate of the game. The game-loop constantly updates the state of the game at a particular frame rate. The frame rate of the game-loop depends on the hardware that the game is running on. For example, the frame rate may be 30 Hz on hardware with a first specification, but 60 Hz on hardware with a second specification. It may also vary on the same hardware or even during the same game session depending on game settings, such as the graphical settings or current in game content being rendered.

By contrast, the physics engine is typically updated at a fixed rate independent of the underlying hardware and game-loop in order to provide numerical stability and consistency in the simulated in-game physics across platforms. In other words, the time step between each physics update is fixed at a particular $\Delta t$. This time step is used to perform simulations of the in-game physics, for example by numerically updating in-game physical quantities based on underlying differential equations for the physics of the in-game objects. In some instances, the underlying equations for the physics of the in-game objects may be chaotic, so using different update times would produce wildly different results over time.

A recent trend in computer gaming is to determine in-game physics from in-game animations. Since the animation depends upon frame rate, differences in frame rates vary the discrepancy between the animation update and the physics simulation, which can cause various animation and gameplay issues.

SUMMARY

According to a first aspect of this disclosure, there is described a computer implemented method comprising: updating, using an animation engine, an in-game animation at a first rate; and updating, using an in-game physics engine, an in-game physics state at a second rate, the second rate being different to the first rate. Updating the in-game physics state comprises: interpolating one or more in-game physical parameters corresponding to a physics update time that lies between two consecutive animation update times, the interpolation based on in-game animation frames corresponding to the two consecutive animation update times; and determining the update to the in-game physics state based on the interpolated physical parameters.

Interpolating the one or more in-game physical parameters using the in-game animation frames may comprise: determining one or more in-game physical parameters at each of the two consecutive animation update times from the corresponding in-game animation frames; and determining the one or more in-game physical parameters corresponding to the physics update time by interpolating between the in-game physical parameters at the two consecutive animation update times. The method may further comprise cyclically writing the in-game physical parameters to a data structure in a computer memory, and wherein updating the in-game physics state further comprises retrieving the in-game physical parameters corresponding to the two consecutive animation update times.

Updating the in-game animation may at least in part be based on the in-game physics state. The first rate may be a hardware dependent variable rate corresponding to a game-loop and the second rate may be a fixed. The one or more in-game physical parameters may comprise one or more of: an object pose; an objection position; an object rotation; and/or an object velocity.

According to a further aspect of this disclosure, there is described a system comprising: one or more processors; and a memory the memory storing computer readable instructions that, when executed by the one or more processors, causes the computer to perform operations comprising: updating, using an animation engine, an in-game animation at a first rate; and updating, using an in-game physics engine, an in-game physics state at a second rate, the second rate being different to the first rate. Updating the in-game physics state comprises: interpolating one or more in-game physical parameters corresponding to a physics update time that lies between two animation update times based on in-game animation frames corresponding to the two animation update times; and determining the update to the in-game physics state based on the interpolated physical parameters.

Interpolating the one or more in-game physical parameters using the in-game animation frames may comprise: determining one or more in-game physical parameters at each of the two animation update times from the corresponding in-game animation frames; and determining the one or more in-game physical parameters corresponding to the physics update time by interpolating between the in-game physical parameters at the two animation update times. The method may further comprise cyclically writing the in-game physical parameters to a data structure in a computer memory, and wherein updating the in-game physics state further comprises retrieving the in-game physical parameters corresponding to the two animation update times.

The animation update times may be consecutive animation update times. Updating the in-game animation may at least in part be based on the in-game physics state. The first rate may be a hardware dependent variable rate corresponding to a game-loop and the second rate is a fixed rate independent of the game-loop. The one or more in-game physical parameters may comprise one or more of: an object pose; an objection position; an object rotation; and/or an object velocity.

According to a further aspect of this disclosure, there is described a non-transitory computer readable medium comprising computer readable code that, when executed by a computing device, causes the computing device to perform operations comprising: updating, using an animation engine, an in-game animation at a first rate; and updating, using an in-game physics engine, an in-game physics state at a second rate, the second rate being different to the first rate. Updating the in-game physics state comprises: estimating one or more in-game physical parameters corresponding to a physics update time that does not coincide with an animation update time based on in-game animation frames corresponding to at least two animation update times; and determining the update to the in-game physics state based on the estimated physical parameters.

The physics update time may lie between two animation update times. Estimating the one or more in-game physical parameters using the in-game animation frames may comprise: determining one or more in-game physical parameters at each of the two animation update times from the corresponding in-game animation frames; and determining the one or more in-game physical parameters corresponding to the physics update time by interpolating between the in-game physical parameters at the two animation update times. The operations may further comprise cyclically writing the in-game physical parameters to a data structure in a computer memory, and wherein updating the in-game physics state further comprises retrieving the in-game physical parameters corresponding to the two animation update times.

Updating the in-game animation may at least in part be based on the in-game physics state. The first rate may be a hardware dependent variable rate corresponding to a game-loop and the second rate may be a fixed rate independent of the game-loop. The one or more in-game physical parameters may comprise one or more of: an object pose; an objection position; an object rotation; and/or an object velocity.

Estimating one or more in-game physical parameters corresponding to a physics update time that does not coincide with an animation update time may comprise interpolating one or more in-game physical parameters corresponding to a physics update time that lies between two consecutive animation update times, the interpolation based on in-game animation frames corresponding to the two consecutive animation update times.

BRIEF DESCRIPTION OF THE DRAWINGS

Embodiments will now be described by way of non-limiting examples with reference to the accompanying drawings, in which.

DETAILED DESCRIPTION

Figure 1:
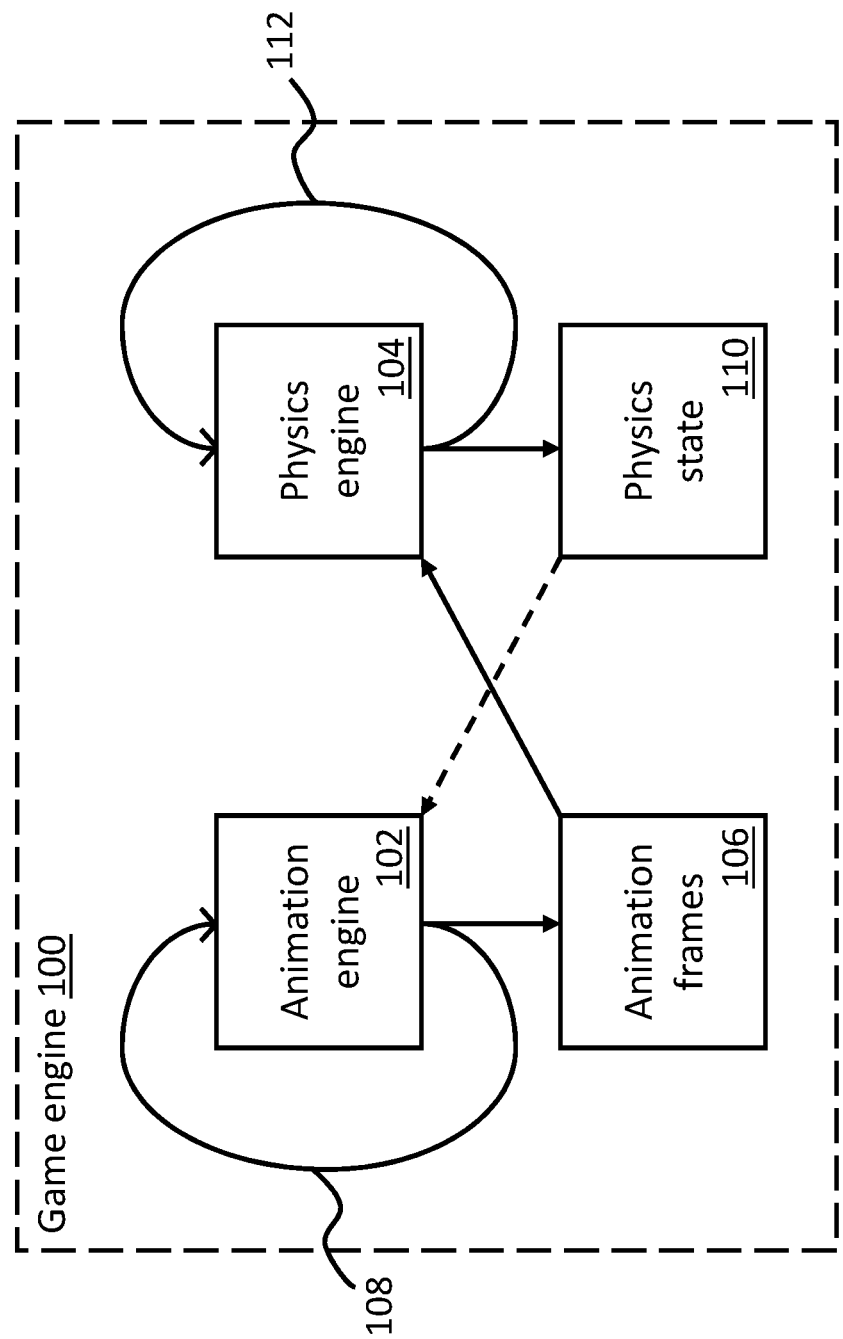
FIG. 1 shows a schematic diagram of a game engine for a computer game comprising an animation engine and a physics engine.

FIG. 1 shows a schematic diagram of a game engine 100 for a computer game comprising an animation engine and a physics engine.

The game engine 100 controls the overall flow of a game while it is running on a computing device (such as a games console or personal computer) by continuously updating a game state in a game-loop based on a plurality of factors that include the current and/or previous game state, current and/or previous user inputs, in-game AI, in-game animations and/or physics states of in-game objects/the game world. The game engine 100 comprises an animation engine 102 and a physics engine 104. Additional components may be present in the game engine, such as an audio subsystem, input control subsystem and the like.

The animation engine 102 (which may also be referred to as a "graphics engine" or "rendering engine") generates frames of in-game animations 106 at a first rate 108 (which may also be referred to herein as a "frame rate"). In other words, the animation engine renders scenes from the game at a particular frame rate for display to the user. The first rate may be the update rate of the game-loop, i.e. the animation update rate is synchronized with the game-loop update rate. Typically, this rate is hardware dependent, i.e. it varies depending on the hardware that the game is running on. For example, the frame rate may be 30 Hz on game consoles of a first type, but 60 Hz on a games consoles of a second type. If the game is running on a personal computer, then the frame rate may depend on the particular specifications of that personal computer. In some instances, the frame rate may additionally vary during gameplay on a particular set of hardware. For example during graphically intensive sections of gameplay, the frame rate may decrease.

The animation engine 102 generates frames of in-game animations 106 based on one or more inputs to the animation engine 102. The inputs may include one or more of: one or more previous animation frames; one or more user inputs to the game; the physics state of the game (i.e. the values of physical quantities of objects in the game); predefined animations; and/or any other variables required for in-game animation known in the art. The in game animation frames 106 may be stored in a buffer after they have been determined by the animation engine before being output for display to the user, i.e. there may be a lag between the generation of an animation frame and its display to the user on a screen.

The physics engine 104 updates an in-game physics state 110 of one or more in-game objects at a second rate 112. The second rate 112 is different from the first rate 108, such that one or more of the update times by the physics engine 104 are out of sync with the updates by the animation engine 102. For numerical stability across platforms, the second rate may be fixed across hardware platforms, i.e. the spacing between physics update times is a constant $\Delta t$ on all hardware platforms/specifications. As used herein, the term "physics state" is preferably used to connote the values of physical quantities of objects in the game world. Such physical quantities may comprise one or more of: an object momentum (e.g. linear momentum, angular momentum and/or generalized momentum); an object velocity; an object energy; one or more forces acting on an object; a collision detection property; fluid dynamics; rigid body dynamics; soft body dynamics and/or any other physical quantity or property used in-game that is known in the art.

The physics engine 104 updates in-game physics states 110 based on current values of physical parameters derived from the in-game animation frames 106. As used herein, the term "physical parameters" is preferably used to connote the input physical variables to the physics engine from which the physics state is determined at each physics update time. Such physical parameters may include, for example, one or more of: a pose of an in-game object; a position of an in-game object; a rotation of an in-game object; and/or a velocity of an in-game object. These physical parameters are used to simulate the physics of in-game objects in order to determine the updates to the in-game physics state 110. The physics simulations performed by the physics engine may include: collision detection and simulation; rigid body dynamics; soft body dynamics; and/or fluid dynamics.

Due to the physics updates, being out of sync with the animation updates, physical parameters at some physics update times cannot be directly extracted from a single animation frame. Instead, the values of the physical parameters at that physics update time are estimated based on the content of two or more animation frames from times that do not coincide with the physics update time. In some implementations, values of the physical parameters at the physics update time are interpolated (e.g. using linear interpolation, bilinear interpolation or the like) from the values of the physical parameters at two animation frames, a first animation frame corresponding to a time preceding the physics update time and a second animation frame corresponding to a time following the physics update time. It should be emphasised that the "update times" refer to game-time, and not real time—i.e. the physics update time lies between the two animation times in the game timeline, but is performed in real time after the second animation update time.

In some implementations, the physical parameters extracted from each frame of animation 106 are written to a buffer/data structure to store them for later use by the physics engine. A plurality of sets of physical parameters from the most recent animation frames may be stored in a buffer, with the oldest set of physical parameters being overwritten by the latest set of physical parameters as they are determined. For example, the buffer may store physical parameters corresponding to the eight most recent animation frames 106. The game engine 100 retrieves the relevant parameters from the buffer for use by the physics engine 104 at each physics update time.

In some implementations, the physics engine 104 may additionally use previous values of the in-game physical parameters and/or a previous game physics state 110 in the physical simulation.

The in-game physics state 110 may also be used as an input to the animation engine 102 to determine the animation frames 106 at an animation update time. Since the animation update time is out of sync with the physics update time, the in-game physics state at the animation update time is not known. As the animation update times typically occur ahead of the physics update times in real time (e.g. the frame at game time t is typically determined in real time before the physics update at game time t−δ), the animation engine 102 only in-game physics states available from game times in the past. To obtain the physics state at the game time of the animation update, an extrapolation procedure may be applied to the physics state from the most recent game time. Such a procedure is described in more detail below with respect to FIG. 3.

Figure 2:
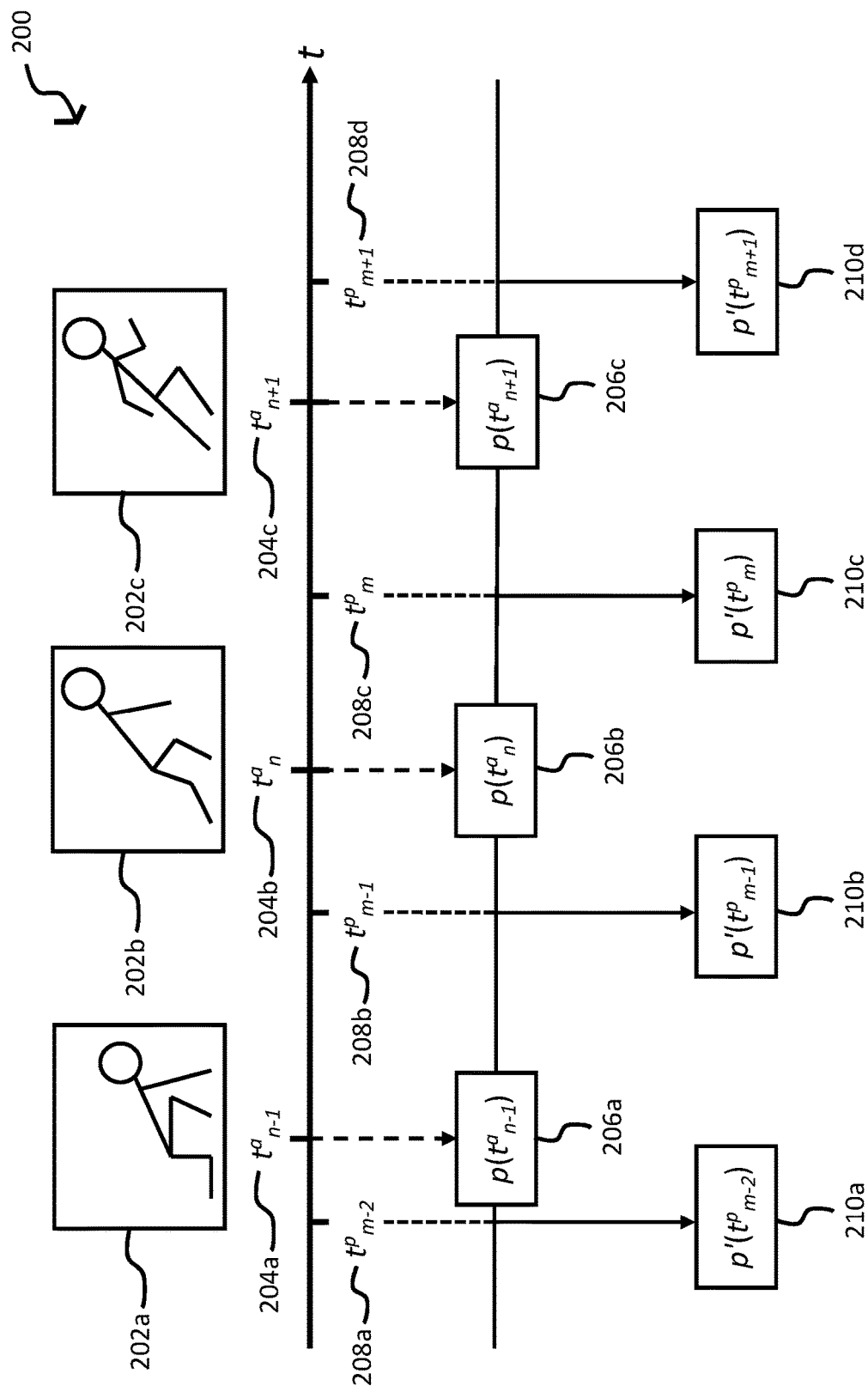
FIG. 2 shows a schematic overview of a method for updating an in-game physics state based on animation updates.

FIG. 2 shows a schematic overview of a method 200 for updating an in-game physics state based on animation updates.

The animation engine updates an in-game animation 202a-c (in this example, a runner) at a sequence of animation update times 204a-c, $t^a$, in game time, t. The animation update times 204a-c, $t^a$, occur at a first rate, which may be equal to the frame rate of the game-loop. The animation frames 202a-c are output for display at a rate equal to the frame rate of the game.

For each of the animation update times 204a-c, values of one or more physical parameters at that animation time 206a-c, $p(t^a)$, of an object are extracted from the animation frame 202a-c for that time. The extracted values of the physical parameters are stored in a data structure for future use by the physics engine. For example, the extracted physical parameters from the most recent q frames may be cyclically written to data structure in the computer memory, with the extracted physical parameters from the required animation update times retrieved from the data structure for use by the physics engine as required.

The physics engine updates an in-game physics state at a sequence of physics update times 208a-d, $t^p$, in game time, t, based on values of the physical parameters at the physics update times 210a-d, $p'(t^p)$. The physics update times 208a-d, $t^p$, occur at a second rate that is different from the first rate. In the example shown, the second rate is higher than the first rate, though in some implementations the first rate may be higher than the second rate. Since the second rate differs from the first rate, one or more of the physics update times 208a-d do not coincide with an animation update time 204a-c in game time. In the example shown, none of the physics update times 208a-d coincide with an animation update time 204a-c, but in general a subset of the physics update times may each coincide with an animation update time, for example if the second rate is a (proper or improper) fraction of the first rate.

To obtain an estimate of physical parameters at a physics update times 208a-d that does not coincide with an animation update time 204a-c, the values of the physical parameters at the animation update times 206a-c are used to estimate values of the physical parameters at a physics update times 210a-d. The estimation may be weighted such that values of the physical parameters at an animation update time closest to the physics update time is weighted higher in the estimation than values of the physical parameters at animation update times further from the physics update time.

An interpolation method may be applied to the values of the physical parameters at consecutive animation update times 206a-c from animation frames either side of a given physics update time 208a-d in order to estimate the physical parameters 210a-d at that physics update time 208a-d. For example, a linear interpolation method may be applied to the values of the physical parameters at the animation update times 206a-c from animation frames either side of a given physics update time 208a-d. Alternative interpolation methods, such as cubic interpolation, may alternatively be used.

In some implementations, the one or more physical parameters at the physics update times 210a-d may be physical parameters that are not present in the one or more physical parameters at the animation update times 206a-c, but are derivable from them. For example, the physical parameters at the physics update times 210a-d may comprise a velocity of an object in the game world, but the physical parameters at the animation update times 206a-c may only comprise a pose/position of the object. The velocity may then be determined by numerically differentiating pose/position variables, e.g. $v=\Delta x/\Delta t$ for a time step $\Delta t$. The time step $\Delta t$ may be fixed and different from the time between animation updates and physics updates, in which case the pose/position values for calculating $\Delta x$ do not coincide with known pose/position values from the animation updates. In this case, the required pose/position values for calculating $\Delta x$ (e.g. the pose/position values at times $t^p_m \pm \Delta t$) are interpolated from the physical parameters at the animation update times 206a-c.

Where a physics update time 208a-d coincides with an animation update time 204a-c, the physical parameters 206a-c extracted from the animation frame 202a-c at that time can be used by the physics engine without any estimation process being applied.

To provide a specific example, consider the physics update at time $t^p_m$ 208c in FIG. 2. This physics update time 208c lies between consecutive animation update times $t^a_n$ 204b and $t^a_{n+1}$ 204c. The animation updates 202b, 202c for these animation update times 204b, 204c have been calculated previously in real time, and the values of physical parameters corresponding to those animation frames 206b, 206c (i.e. $p(t^a_n)$ and $p(t^a_{n+1})$) have been determined and stored. The game engine retrieves the stored physical parameters corresponding to the animation frames 206b, 206c and applies an interpolation method to them to determine an estimate of the physical parameters $p'(t^p_m)$ 210c at the physics update time $t^p_m$ 208c. This can be represented symbolically as $p'(t^p_m) = I(p(t^a_n), p(t^a_{n+1}), t^a_n, t^a_{n+1})$, where I is an interpolation function. As described in the previous paragraph, one or more of the physical parameters $p'(t^p_m)$ 210c at the physics update time $t^p_m$ 208c may be parameters that are not present in the physical parameters corresponding to those animation frames 206b, 206c, but are derivable from them.

The physics engine uses estimate of the physical parameters $p'(t^p_m)$ 210c to update an in-game physics state, $S(t^p_m)$. As discussed above, the estimated physical parameters $p'(t^p_m)$ 210c are used as variables in an in-game physics simulation to simulate the physical behavior of one or more in-game objects, such as rigid body dynamics, soft body dynamics, fluid dynamics and/or collision detection/dynamics.

Figure 3:
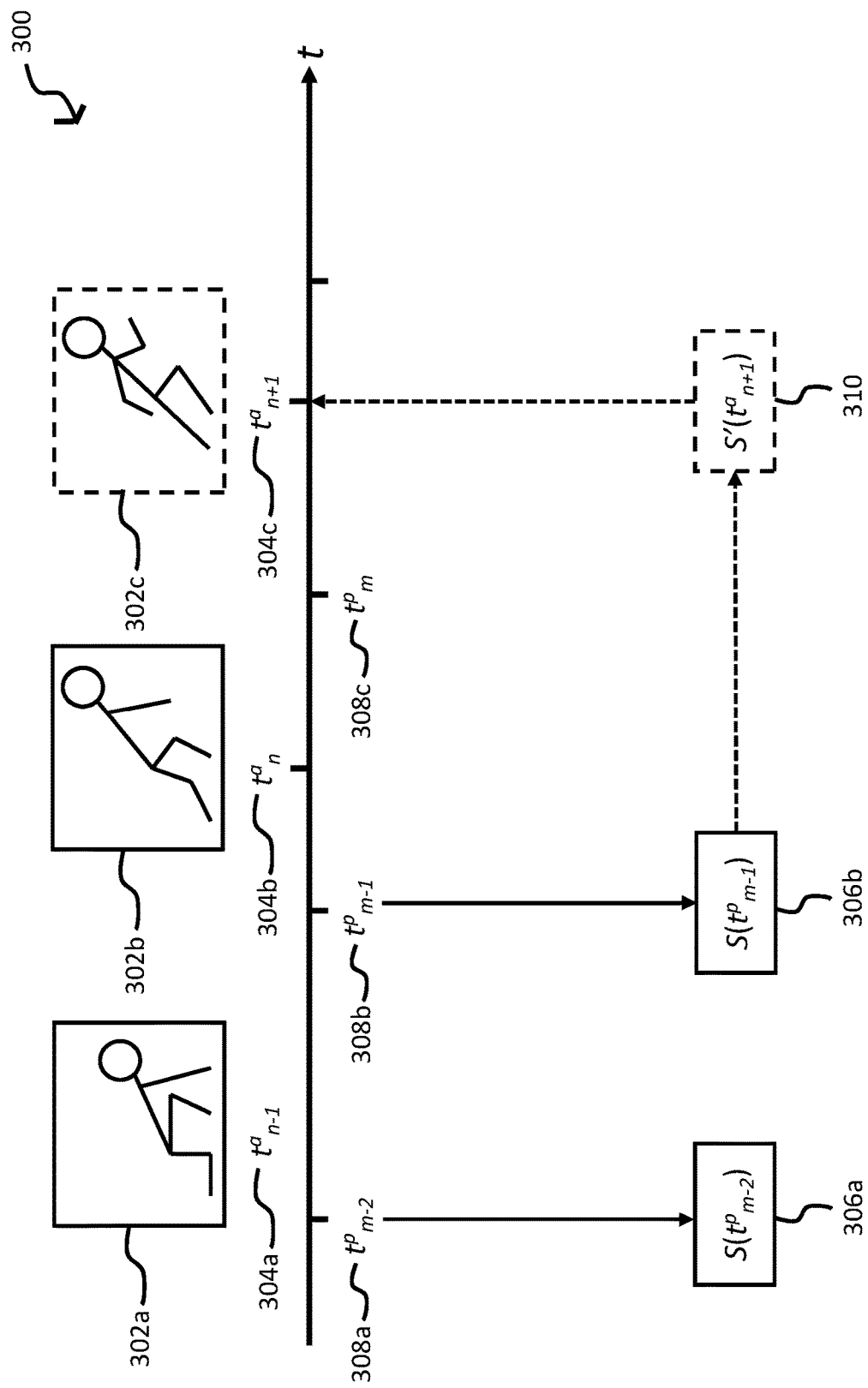
FIG. 3 shows a schematic overview of a method for updating an in-game animation based on an in-game physics state.

In some implementations, the animation updates are further based on the in-game physics state. FIG. 3 shows a schematic overview of a method 300 for updating an in-game animation based on an in-game physics state.

The animation engine updates an in-game animation 302a-c (in this example, a runner) at a sequence of animation update times 304a-c, $t^a$, in game time, t, while the physics engine updates an in-game physics state 306a-b, S(t), at a sequence of physics update times 308a-c, $t^p$, in game time, t, based on values of physical parameters at the physics update times, $p'(t^p)$ that are estimated from values of physical parameters extracted from the animation frames. This process proceeds as described above in relation to FIG. 2.

Since the animation updates in these implementations are based on the in-game physics state, when the animation engine comes to generate the next/current frame 302C in the animation, it requires at least a part of the in-game physics state 310, S', at the animation time 304c corresponding to the animation frame 302c. However, since the in-game physics state updates 306a-b are not in general in sync with the animation updates, the required values from the in game physics state 310 at the animation update time 304c is not available. Furthermore, since the in-game physics updates 306a-b are based on frames of animation data 302a-b that occur either side of the corresponding physics update time 308a-c, the most recently available in-game physics state 306b occurs at a game time prior to at least the previous animation update 304b (and in some implementations may lag behind the animation update time even further). Using values from the previous in-game physics state 304b as the required values for the in-game physics state for the next/current animation update would thus use out-of-date parameters, and result in an incorrect/unrealistic animation update.

To prevent the next/current animation update 302c being based on such a lagging physics, the required values from in-game physics state at the current animation update time, $S'(t^a_{n+1})$, 310 are estimated from one or more previous in-game physics states 306a-b. In some implementations, the required values at the current animation update time comprise a subset of a full in-game physics state. In these implementations, only the required values may be estimated, i.e. the full in-game physics state at the animation update time is not estimated, only the required subset. In other implementations, the animation updates require the full in-game physics state at the corresponding animation update time. In these implementations, the full in-game physics state at the animation update time is interpolated, i.e. $S'(t) = S(t)$.

In some implementations, only the most recent in-game physics state 306b is used to perform the estimation. In other implementations, a plurality of previous in-game physics states 306a-b are used to estimate the current physics state 310. Estimating the current in-game physics state 310 may comprise the use of an extrapolation method. Any extrapolation method known in the art may be used to estimate the current in-game physics state.

Figure 4A:
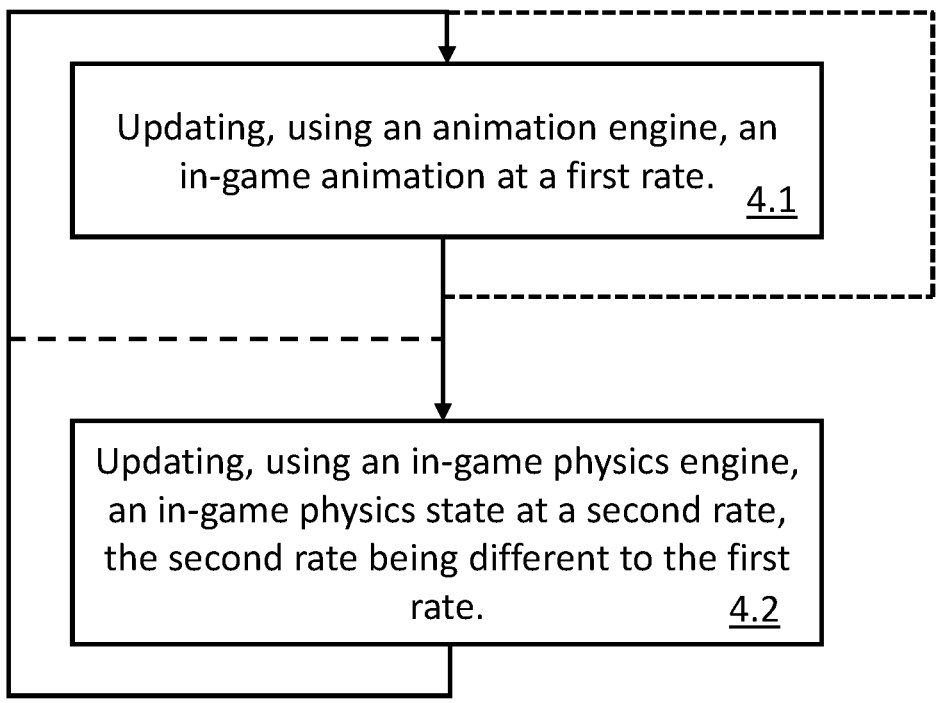
FIG. 4a shows a flowchart of an example method for updating an in-game animation and an in-game physics state during execution of a computer game.

FIG. 4a shows a flowchart of an example method for updating an in-game animation and an in-game physics state during execution of a computer game. The method may be implemented by one or more computers operating at one or more locations.

At operation 4.1, an animation engine is used to update an in-game animation at a first rate. The first rate may be equal to the rate of the game-loop updates, i.e. the animation updates are synchronized with the overall game-loop. The first rate may be a hardware dependent rate, i.e. be different when the computer game is running on different hardware. Furthermore, the first rate may be variable during the same gaming session, for example depending on the current in-game content being animated.

At operation 4.2, an in-game physics engine is used to update at in-game physics state at a second rate. The second rate is different for the first rate, such that one or more of the in-game physics update times does not coincide with an in-game animation update time in game time. In some implementation, the second rate is higher than the first rate. Alternatively, the second rate may be lower than the first rate.

The second rate may be a fixed rate that is independent of the hardware running the game, i.e. the second rate is the same on all hardware. Furthermore, the second rate may be fixed during the same gaming session, and may be independent of the current in-game content being animated/simulated.

In some implementations, depending on the ration of the first and second update rates, a plurality of animation updates may occur between one or more of the in-game physics updates. Alternatively or additionally, a plurality of in-game physics updates may occur between one or more of the animation updates. In implementations where the first rate is variable during the same game session, both situations may occur during the same game session. These options are indicated by the dashed lines in FIG. 4a.

In some implementations, one or more of the animation update times may each coincide with physics update time. However, since the first and second update rates differ, this will not occur for all updates.

Figure 4B:
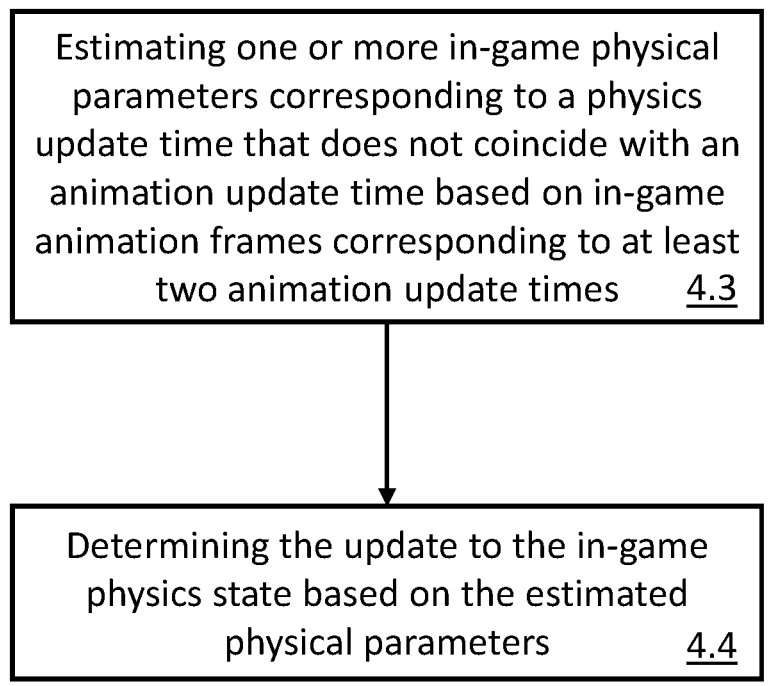
FIG. 4b shows a flowchart of an example method for updating an in-game physics state.

FIG. 4b shows a flowchart of an example method for updating an in-game physics state. The method may be performed during the implementation of operation 4.2 of FIG. 4a. The method may be implemented by one or more computer operating at one or more locations.

At operation 4.3, one or more in-game physical parameters corresponding to a physics update time that does not coincide with an animation update time is estimated. The in-game physical parameters are estimated based on in-game animation frames corresponding to at least two animation update times.

The one or more in-game physical parameters comprise one or more of: an object pose; an objection position; an object rotation; and/or an object velocity.

Estimating the one or more in-game physical parameters may comprise interpolating one or more in-game physical parameters corresponding to a physics update time that lies between two animation update times based on in-game animation frames corresponding to the two animation update times. Any interpolation method known in the art may be used to interpolate the values of the physical parameters. For example, linear interpolation or cubic interpolation may be used. The two animation update times may be consecutive animation times.

In some implementations, interpolating the one or more in-game physical parameters using the in-game animation frames comprises determining one or more in-game physical parameters at each of the two consecutive animation update times from the corresponding in-game animation frames and determining the one or more in-game physical parameters corresponding to the physics update time by interpolating between the in-game physical parameters at the two consecutive animation update times. The physical parameters of an object may be determined from the animation updates, for example, by fitting a parametrized object model to each of the animation frames and extracting the parameters of the model once it has been fitted to the animation frame. For example, if a human body is being animated, a parametrized full body model may be fitted to the animation frame and the pose of the body extracted from the fitted model. Many other examples will be familiar in the art.

In some implementations, the in-game physical parameters for each animation frame are cyclically written to a data structure in a computer memory. For example, the physical parameters associated with an animation frame are extracted at the animation update time for that frame, and then written to a memory. The memory stores a fixed number of the most recently extracted sets of physical parameters, with the oldest set of physical parameters being overwritten when the set of parameters from the latest animation frame are determined. In these implementations, updating the in-game physics state further comprises retrieving the in-game physical parameters corresponding to the animation update times used to estimate the physical parameters at the in-game physics update time.

Alternatively, in some implementations, the animation frames are cyclically written to a data structure in a computer memory. The memory stores a fixed number of the most recently animation frames, with the oldest animation frame being overwritten when the latest animation frame is determined. In these implementations, updating the in-game physics state further comprises retrieving the animation frames corresponding to the animation update times used to estimate the physical parameters at the in-game physics update time, and extracting the physical parameters used in the estimation process from them.

In some implementations, an operation of determining if the physics update time coincides with an animation update time in game time is performed prior to performing operation 4.3.

In response to a positive determination that the physics update time coincides with an animation update time, operation 4.3 is skipped, and physical parameters extracted from the animation update at the corresponding animation update time are used directly by the physics engine, i.e. the estimated physical parameters are the physical parameters extracted from the animation frame, and no interpolation is performed.

In response to a negative determination that the physics update time coincides with an animation update time, operation 4.3 is performed as described above.

At operation 4.4, updates to the in-game physics state are determined based on the estimated physical parameters. The estimated physical parameters are input to a physics simulation that determines an updated in-game physics state based on physical models of the game world. The physics simulation may be based on numerically solving one or more differential, algebraic and/or integral equations. In some implementations, the physics simulation may use the in-game physics state from the previous physics update time as input/an initial state for the simulation.

Figure 5:
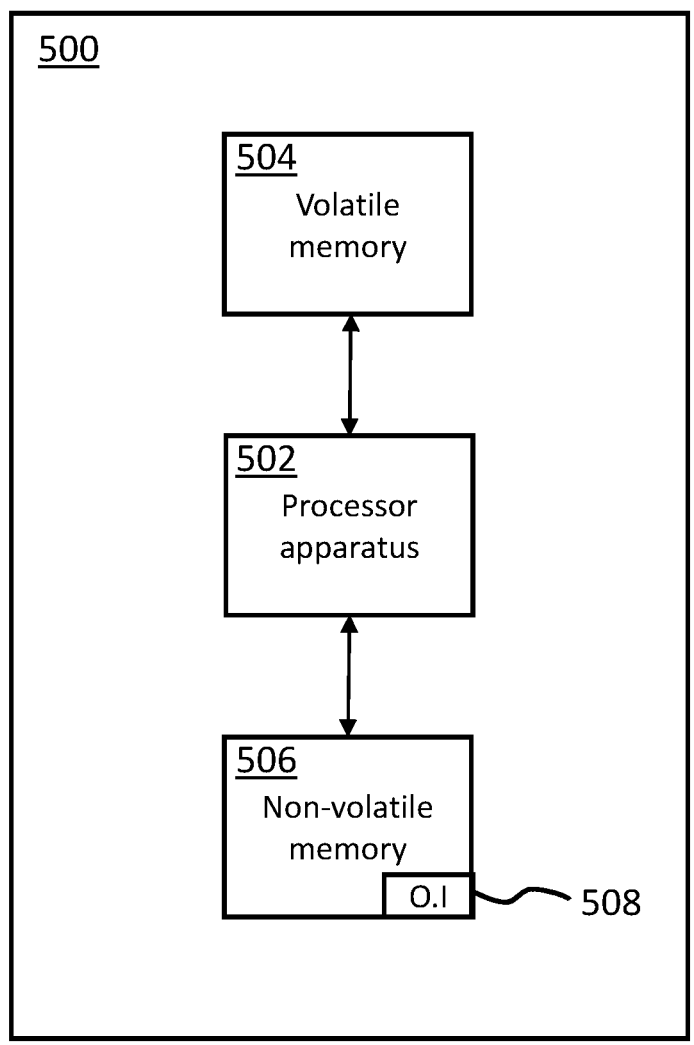
FIG. 5 shows a schematic example of a system/apparatus for performing any of the methods described herein.

FIG. 5 shows a schematic example of a system/apparatus for performing any of the methods described herein. The system/apparatus shown is an example of a computing device. It will be appreciated by the skilled person that other types of computing devices/systems may alternatively be used to implement the methods described herein, such as a distributed computing system.

The apparatus (or system) 500 comprises one or more processors 502. The one or more processors control operation of other components of the system/apparatus 500. The one or more processors 502 may, for example, comprise a general purpose processor. The one or more processors 502 may be a single core device or a multiple core device. The one or more processors 502 may comprise a Central Processing Unit (CPU) or a graphical processing unit (GPU). Alternatively, the one or more processors 502 may comprise specialized processing hardware, for instance a RISC processor or programmable hardware with embedded firmware. Multiple processors may be included.

The system/apparatus comprises a working or volatile memory 504. The one or more processors may access the volatile memory 504 in order to process data and may control the storage of data in memory. The volatile memory 504 may comprise RAM of any type, for example Static RAM (SRAM), Dynamic RAM (DRAM), or it may comprise Flash memory, such as an SD-Card.

The system/apparatus comprises a non-volatile memory 506. The non-volatile memory 506 stores a set of operation instructions 508 for controlling the operation of the processors 502 in the form of computer readable instructions. The non-volatile memory 506 may be a memory of any kind such as a Read Only Memory (ROM), a Flash memory or a magnetic drive memory.

The one or more processors 502 are configured to execute operating instructions 508 to cause the system/apparatus to perform any of the methods described herein. The operating instructions 508 may comprise code (i.e. drivers) relating to the hardware components of the system/apparatus 500, as well as code relating to the basic operation of the system/apparatus 500. Generally speaking, the one or more processors 502 execute one or more instructions of the operating instructions 508, which are stored permanently or semi-permanently in the non-volatile memory 506, using the volatile memory 504 to store temporarily data generated during execution of said operating instructions 508.

Implementations of the methods described herein may be realized as in digital electronic circuitry, integrated circuitry, specially designed ASICs (application specific integrated circuits), computer hardware, firmware, software, and/or combinations thereof. These may include computer program products (such as software stored on e.g. magnetic discs, optical disks, memory, Programmable Logic Devices) comprising computer readable instructions that, when executed by a computer, such as that described in relation to FIG. 5, cause the computer to perform one or more of the methods described herein.

Any system feature as described herein may also be provided as a method feature, and vice versa. As used herein, means plus function features may be expressed alternatively in terms of their corresponding structure. In particular, method aspects may be applied to system aspects, and vice versa.

Furthermore, any, some and/or all features in one aspect can be applied to any, some and/or all features in any other aspect, in any appropriate combination. It should also be appreciated that particular combinations of the various features described and defined in any aspects of the invention can be implemented and/or supplied and/or used independently.

Although several embodiments have been shown and described, it would be appreciated by those skilled in the art that changes may be made in these embodiments without departing from the principles of this disclosure, the scope of which is defined in the claims.

The invention claimed is:

1. A computer implemented method comprising:
updating, using an animation engine, an in-game animation at a first rate; and
updating, using an in-game physics engine, an in-game physics state at a second rate, the second rate being different to the first rate, wherein updating the in-game physics state comprises:
  interpolating one or more in-game physical parameters corresponding to a physics update time in game time that lies between two consecutive animation update times in game time, the interpolation based on in-game animation frames corresponding to the two consecutive animation update times; and
  determining a physics update to the in-game physics state at the physics update time in game time based on the interpolated one or more in-game physical parameters,
wherein the physics update time lags behind a corresponding animation update time of the animation update times in real time by at least one animation update.

2. The method of claim 1, wherein interpolating the one or more in-game physical parameters using the in-game animation frames comprises:
determining one or more in-game physical parameters at each of the two consecutive animation update times in game time from the corresponding in-game animation frames; and
determining the one or more in-game physical parameters corresponding to the physics update time in game time by interpolating between the one or more in-game physical parameters at the two consecutive animation update times in game time.

3. The method of claim 2, wherein the method further comprises cyclically writing the one or more in-game physical parameters to a data structure in a computer memory, and wherein updating the in-game physics state further comprises retrieving the one or more in-game physical parameters corresponding to the two consecutive animation update times in game time.

4. The method of claim 1, wherein updating the in-game animation is at least in part based on the in-game physics state.

5. The method of claim 1, wherein the first rate is a hardware dependent variable rate corresponding to a game-loop and the second rate is a fixed rate independent of the game-loop.

6. The method of claim 1, wherein the first rate is lower than the second rate.

7. The method of claim 1, wherein the one or more in-game physical parameters comprise one or more of: an object pose; an objection position; an object rotation; and/or an object velocity.

8. A system comprising:
one or more processors; and
a memory, the memory storing computer readable instructions that, when executed by the one or more processors, causes the computer to perform operations comprising:
updating, using an animation engine, an in-game animation at a first rate; and
updating, using an in-game physics engine, an in-game physics state at a second rate, the second rate being different to the first rate, wherein updating the in-game physics state comprises:
  interpolating one or more in-game physical parameters corresponding to a physics update time in game time that lies between two animation update times in game time based on in-game animation frames corresponding to the two animation update times; and
  determining a physics update to the in-game physics state based on the interpolated one or more in-game physical parameters,
wherein the physics update time lags behind a corresponding animation update time of the animation update times in real time by at least one animation update.

9. The system of claim 8, wherein interpolating the one or more in-game physical parameters using the in-game animation frames comprises:
determining one or more in-game physical parameters at each of the two animation update times in game time from the corresponding in-game animation frames; and
determining the one or more in-game physical parameters corresponding to the physics update time in game time by interpolating between the one or more in-game physical parameters at the two animation update times.

10. The system of claim 9, wherein the operations further comprise cyclically writing the one or more in-game physical parameters to a data structure in a computer memory, and wherein updating the in-game physics state further comprises retrieving the one or more in-game physical parameters corresponding to the two animation update times in game time.

11. The system of claim 8, wherein the two animation update times are consecutive animation update times and wherein updating the in-game animation is at least in part based on the in-game physics state.

12. The system of claim 8, wherein the first rate is a hardware dependent variable rate corresponding to a game-loop and the second rate is a fixed rate independent of the game-loop.

13. The system of claim 8, wherein the one or more in-game physical parameters comprise one or more of: an object pose; an objection position; an object rotation; and/or an object velocity.

14. A non-transitory computer readable medium comprising computer readable code that, when executed by a computing device, causes the computing device to perform operations comprising:

updating, using an animation engine, an in-game animation at a first rate; and updating, using an in-game physics engine, an in-game physics state at a second rate, the second rate being different to the first rate, wherein updating the in-game physics state comprises:

estimating one or more in-game physical parameters corresponding to a physics update time in game time that does not coincide with an animation update time based on in-game animation frames corresponding to at least two animation update times in game time; and determining a physics update to the in-game physics state based on the estimated physical parameters, wherein the physics update time lags behind a corresponding animation update time of the animation update times in real time by at least one animation update.

15. The non-transitory computer readable medium of claim 14, wherein the in-game physics update time lies between two animation update times in game time and wherein estimating the one or more in-game physical parameters using the in-game animation frames comprises:

determining one or more in-game physical parameters at each of the two animation update times in game time from the corresponding in-game animation frames; and determining the one or more in-game physical parameters corresponding to the physics update time in game time by interpolating between the one or more in-game physical parameters at the two animation update times.

16. The non-transitory computer readable medium of claim 15, wherein the operations further comprise cyclically writing the one or more in-game physical parameters to a data structure in a computer memory, and wherein updating the in-game physics state further comprises retrieving the one or more in-game physical parameters corresponding to the two animation update times in game time.

17. The non-transitory computer readable medium of claim 14, wherein updating the in-game animation is at least in part based on the in-game physics state.

18. The non-transitory computer readable medium of claim 14, wherein the first rate is a hardware dependent variable rate corresponding to a game-loop and the second rate is a fixed rate independent of the game-loop.

19. The non-transitory computer readable medium of claim 14, wherein estimating one or more in-game physical parameters corresponding to a physics update time that does not coincide with an animation update time comprises interpolating one or more in-game physical parameters corresponding to a physics update time in game time that lies between two consecutive animation update times in game time, the interpolation based on the in-game animation frames corresponding to the two consecutive animation update times.

20. The non-transitory computer readable medium of claim 14, wherein the one or more in-game physical parameters comprise one or more of: an object pose; an objection position; an object rotation; and/or an object velocity.

* * * * *